(12) United States Patent
Datta et al.

(10) Patent No.: US 8,751,414 B2
(45) Date of Patent: Jun. 10, 2014

(54) IDENTIFYING ABNORMALITIES IN RESOURCE USAGE

(75) Inventors: Ankur Datta, White Plains, NY (US);
Charles A. Otto, Lansing, MI (US);
Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 13/100,868

(22) Filed: May 4, 2011

(65) Prior Publication Data
US 2012/0284211 A1    Nov. 8, 2012

(51) Int. Cl.
*G06N 5/04*     (2006.01)
*G06F 11/07*    (2006.01)
*G06F 11/30*    (2006.01)

(52) U.S. Cl.
CPC ........ *G06F 11/0751* (2013.01); *G06F 11/3058* (2013.01); *G06F 11/3082* (2013.01)
USPC .......................................................... 706/11

(58) Field of Classification Search
CPC ....................................................... G06N 5/04
USPC .............................. 706/11; 713/188; 709/224
See application file for complete search history.

(56) References Cited

U.S. PATENT DOCUMENTS

| | | | |
|---|---|---|---|
| 7,409,407 B2 | 8/2008 | Radhakrishnan et al. | |
| 7,620,523 B2 | 11/2009 | Marvasti et al. | |
| 7,657,399 B2 | 2/2010 | Miller et al. | |
| 7,734,451 B2 | 6/2010 | MacArthur et al. | |
| 7,836,356 B2 | 11/2010 | Haas et al. | |
| 2007/0088534 A1* | 4/2007 | MacArthur et al. | ............ 703/17 |

* cited by examiner

*Primary Examiner* — Jeffrey A Gaffin
*Assistant Examiner* — Ola Olude Afolabi
(74) *Attorney, Agent, or Firm* — Matthew H. Chung; Yee & Associates, PC (57) ABSTRACT

A method, data processing system, and computer program product for identifying abnormalities in data. A model representing a plurality of modes for an activity generated from training data is retrieved. The training data includes a first plurality of measurements of a first performance of the activity over a period of time. Each of the plurality of modes is identified as one of normal and abnormal. Activity data including a second plurality of measurements of a second performance of the activity is received. A portion of the activity data is compared with the plurality of modes in the model. A notification of an abnormality in the second performance of the activity is generated in response to an identification that the portion of the activity data matches a mode in the plurality of modes identified as abnormal. Confirmation of the abnormality is requested via a user interface.

15 Claims, 9 Drawing Sheets

IDENTIFYING ABNORMALITIES IN RESOURCE USAGE

BACKGROUND

1. Field

The disclosure relates generally to monitoring data and more specifically to identifying abnormalities in usage of resources. Still more particularly, the present disclosure relates to identifying abnormalities in the usage of resources from measurements of the usage of the resources.

2. Description of the Related Art

Conserving resources can be helpful in preserving resources and reducing costs associated with the resources. A monitoring system can monitor measurements from usages of the resource. For example, measurements of resources used over a period of time can be obtained. In other examples, images of the activity can be analyzed to monitor movement of objects within the image.

If the measurements fall outside of expected values for the use of the resources, the monitoring system may identify the usage of the resource as abnormal. If movements within the image do not comply with certain rules, the monitoring system may identify the usage of the resource as abnormal. The monitoring system may notify an administrator of the abnormality. The administrator may be able to remedy the use of the resource to correct the abnormality. Correction of the abnormality may help to preserve the resource and reduce costs associated with the resource.

However, the use of expected values for use of the resources may not cover all normal usages of the resource. Additionally, the expected values for use of the resources may include values that actually represent an abnormal usage of the resource under certain conditions. Accordingly, it would be advantageous to have a method and apparatus, which take into account one or more of the issues discussed above as well as possibly other issues.

SUMMARY

The different illustrative embodiments provide a method, data processing system, and computer program product for identifying abnormalities in data. A model representing a plurality of modes for an activity generated from training data is retrieved. The training data includes a first plurality of measurements of a first performance of the activity over a period of time. Each of the plurality of modes is identified as one of normal and abnormal. Activity data including a second plurality of measurements of a second performance of the activity is received. A portion of the activity data is compared with the plurality of modes in the model. A notification of an abnormality in the second performance of the activity is generated in response to an identification that the portion of the activity data matches a mode in the plurality of modes identified as abnormal. Confirmation of the abnormality is requested via a user interface.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The different illustrative embodiments recognize and take into account a number of different considerations. For example, the different illustrative embodiments recognize that it may be desirable to monitor data from an activity to determine when abnormalities have occurred. Persons receiving notification of abnormalities can take remedial actions to correct the abnormalities.

The different illustrative embodiments recognize and take into account that one solution may involve comparing data from a performance of an activity with expected results. For example, if the data from the performance fits within expected results for the activity, the activity may be determined to be normal. On the other hand, if the data from the performance does not fit within expected results for the activity, the activity may be determined to be abnormal.

However, the different illustrative embodiments recognize that comparing data from a performance of an activity with expected results may not account for multiple normal and abnormal modes of operation for the activity. A number of different factors may influence whether the performance is normal or abnormal. The different factors can result in the multiple normal and abnormal modes of operation for the activity. For example, energy usage may depend on a number of different factors, including time of day, temperature, season, and schedule to name a few. While a certain amount of energy usage may be normal during a certain season and schedule, the same amount of energy usage could be abnormal during a different season or schedule.

The different illustrative embodiments further recognize that comparison of data from a performance of an activity with expected results may not take user feedback into account. Whether a resource is used efficiently may be the opinion of a user. For example, certain performances may be an exception. Data from the performance of the activity may not fit within expected results. However, that performance may be an exception to the expected results. A user may be able to identify that the performance of the activity is normal despite the performance not matching expected results. In another example, the expected results may be inaccurate or incomplete. The expected results may not take into account changing circumstances or expectations. In these examples, the different illustrative embodiments recognize that incorporating user feedback may assist in improving accuracy in monitoring future performances of the activity.

Thus, the different illustrative embodiments provide a method, data processing system, and computer program product for identifying abnormalities in data. A model representing a plurality of modes for an activity generated from training data is retrieved. The training data includes a first plurality of measurements of a first performance of the activity over a period of time. Each of the plurality of modes is identified as one of normal and abnormal. Activity data including a second plurality of measurements of a second performance of the activity is received. A portion of the activity data is compared with the plurality of modes in the model. A notification of an abnormality in the second performance of the activity is generated in response to an identification that the portion of the activity data matches a mode in the plurality of modes identified as abnormal. Confirmation of the abnormality is requested via a user interface.

Figure 1:
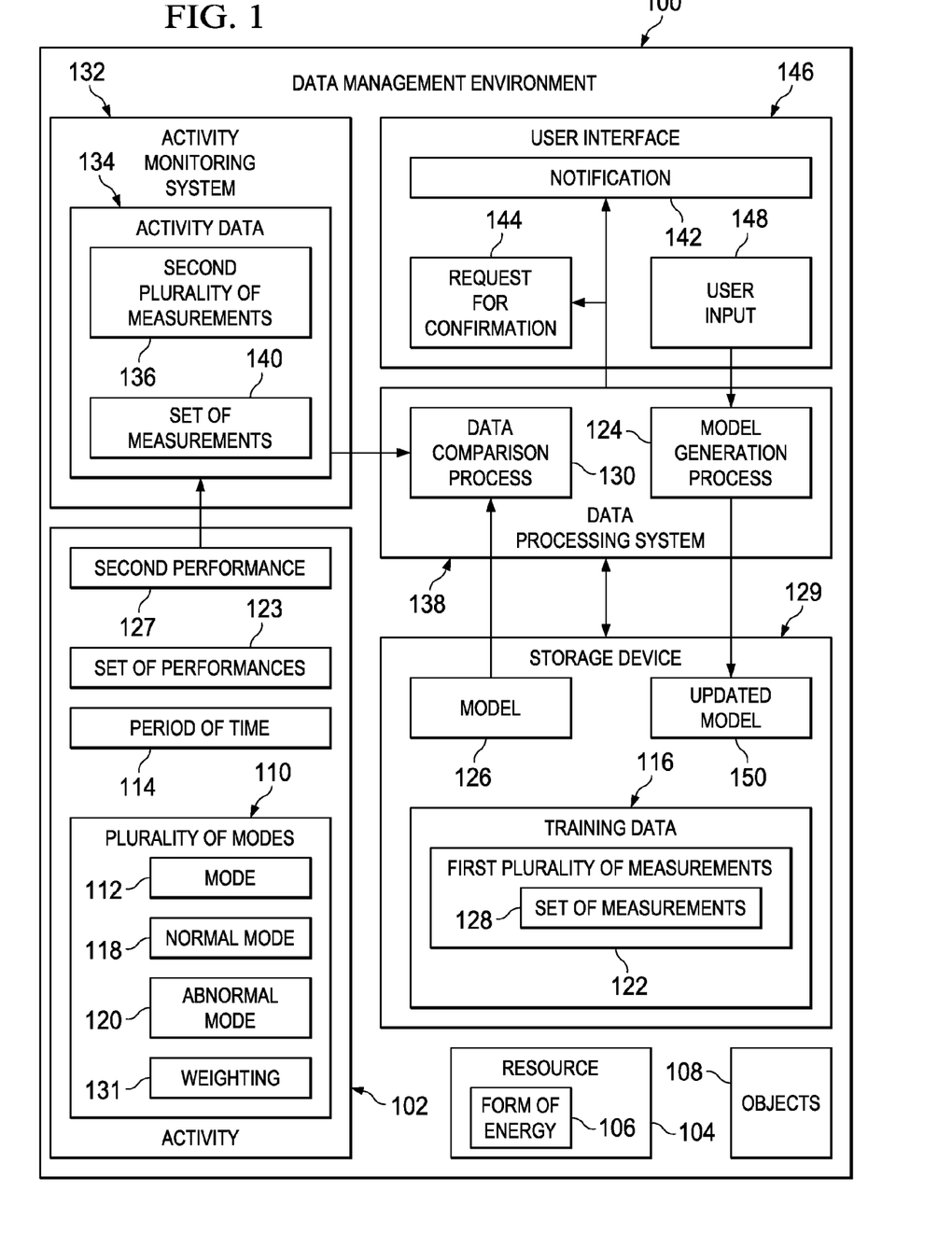
FIG. 1 is a block diagram of a data management environment in accordance with an illustrative embodiment.

With reference now to FIG. 1, a block diagram of a data management environment is depicted in accordance with an illustrative embodiment. Data management environment 100 is an environment in which illustrative embodiments may be implemented.

In these illustrative examples, activity 102 takes place in data management environment 100. Activity 102 is any type of activity that has actions that may be measured. For example, activity 102 may be usage of resource 104. For example, resource 104 may be form of energy 106. In these examples, form of energy 106 is any type of energy that can be used such as, for example, without limitation, electrical energy, chemical energy, nuclear energy, petroleum, helium and/or any other suitable type of energy. In another example, resource 104 may be a physical resource such as, for example, without limitation, water, oxygen, food, or roads. In other examples, resource 104 may be a computing resource such as, for example, without limitation, network resources, data storage resources, or processing capacity. In other examples, activity 102 may also be movement of objects 108. For example, without limitation, activity 102 may be a flow of vehicles on a road or movement of people in an area.

Activity 102 has plurality of modes 110. Plurality of modes 110 includes different examples of ways that activity 102 may be performed. For example, mode 112 may be an amount of usage of resource 104 over period of time 114. In another example, mode 112 may be a certain pattern in the movement of objects 108.

In these illustrative examples, each mode within plurality of modes 110 is identified as either normal mode 118 or abnormal mode 120. Thus, for example, activity 102 may have a plurality of normal modes and a plurality of abnormal modes. Normal mode 118 is a performance of activity 102 that meets expectations. For example, normal mode 118 may have values measured from a performance of activity 102 that are within an expected range of values. In another example, normal mode 118 may be a movement of objects in an area that conforms with a set of rules or expectations. A "set", as used herein with reference to an item, means one or more items. Abnormal mode 120 is a performance of activity 102 that does not meet expectations. For example, abnormal mode 120 may have values measured from a performance of activity 102 that are within the expected range of values. In another example, abnormal mode 120 may be a movement of objects in the area that does not conform with the set of rules or expectations. For example, abnormal mode 120 may be an anomaly in a performance of activity 102.

Training data 116 includes first plurality of measurements 122 from set of performances 123 of activity 102. Set of performances 123 is one or more performances of activity 102 that have already occurred. Thus, in these illustrative examples, training data 116 includes measurements from a plurality of examples of prior performances of activity 102. Training data 116 is used by model generation process 124 to generate model 126 for the performance of activity 102.

Performances in set of performances 123 are examples of different modes in plurality of modes 110. In these examples, first plurality of measurements 122 includes values measured from set of performances 123. For example, first plurality of measurements 122 may include an amount of resource 104 that was used during period of time 114. In other examples, first plurality of measurements 122 may include measurements of movement of objects 108. First plurality of measurements 122 may also include conditions present during set of performances 123 of activity 102.

In these illustrative examples, model generation process 124 uses training data 116 to generate model 126. Model 126 is a function that represents each mode in plurality of modes 110 that occurred in set of performances 123. For example, model 126 is a probability that a mode in plurality of modes 110 will occur as a function of a type or types of measurements from first plurality of measurements 122. In generating model 126, model generation process 124 identifies set of measurements 128 in first plurality of measurements 122 that is specific to each performance in set of performances 123. Model generation process 124 then plots set of measurements 128 for each performance in set of performances 123 as a function of time. Model generation process 124 then generates model 126 as the function that represents the probability that a random measurement would occur based on set of measurements 128 being already known.

In one illustrative example, first plurality of measurements 122 includes values for an amount of resource 104 that was used during each of set of performances 123. Model generation process 124 would plot first plurality of measurements 122. Model 126 would represent the probability that a random measurement would occur based on first plurality of measurements 122. For example, model 126 may be a probability density function. A probability density function is a function that describes the relative likelihood for a random variable to occur at a given point. In one example, model generation process 124 generates model 126 using kernel density estimation.

Model generation process 124 identifies weighting 131 for each mode in plurality of modes 110. Model generation process 124 identifies weighting 131 from model 126. Model generation process 124 identifies weighting 131 from the probability that each mode in plurality of modes 110 will occur from model 126. For example, the more times mode 112 has occurred in set of performances 123, the greater the probability for mode 112 in model 126 relative to other modes.

In these illustrative examples, model generation process 124 stores model 126 in storage device 129 for use by data comparison process 130. Data comparison process 130 uses model 126 to determine whether second performance 127 of activity 102 is normal or abnormal. In these examples, second performance 127 is a performance of activity 102 that is being monitored to determine whether the performance is normal or abnormal. For example, second performance 127 may be a live or presently occurring performance of activity 102.

Activity monitoring system 132 monitors second performance 127 of activity 102. Activity monitoring system 132 may include sensors and/or data gathering devices to obtain activity data 134. Activity data 134 includes second plurality of measurements 136 from second performance 127 of activity 102. In these examples, second plurality of measurements 136 is the same type of measurements as first plurality of measurements 122. For example, if first plurality of measurements 122 includes a value for an amount of resource 104 being used during set of performances 123, then second plurality of measurements 136 includes values for the amount of resource 104 being used during second performance 127. Similarly, if first plurality of measurements 122 includes a value for a condition present during set of performances 123 of activity 102, then second plurality of measurements 136 includes values for the condition present during second performance 127 of activity 102.

Activity monitoring system 132 sends activity data 134 to data processing system 138. Data comparison process 130 in data processing system 138 compares a portion of activity data 134 with model 126 to identify mode 112 in plurality of modes 110 that matches the portion of the activity data 134. Mode 112 is the mode in plurality of modes 110 that matches a portion of activity data 134.

For example, data comparison process 130 places set of measurements 140 from activity data 134 into model 126. Data comparison process 130 compares values from set of measurements 140 with values from plurality of modes 110 in model 126. Data comparison process 130 identifies modes in plurality of modes 110 that have values that are within a range of the values from set of measurements 140. If there is more than one mode that has values that are within a range of the set of measurements 140, data comparison process 130 selects mode 112 based on the weighting 131 of the more than one mode and the closeness in the range of values. For example, if two modes have values that have a similar amount of closeness in the range of values, data comparison process 130 selects the mode having a greater value for weighting 131 as mode 112.

If mode 112 is normal mode 118, data comparison process 130 identifies the portion of activity data 134 as normal. Data comparison process 130 may continue to compare other portions of activity data 134 with model 126. If mode 112 is abnormal mode 120, data comparison process 130 identifies the portion of activity data 134 as abnormal. Data comparison process 130 then sends notification 142 and request for confirmation 144 to user interface 146. Notification 142 is a notification that an abnormality has been detected in second performance 127 of activity 102. Request for confirmation 144 is a request for a user to identify whether notification 142 was correct.

Model generation process 124 receives user input 148 from user interface 146. User input 148 is a response to request for confirmation 144 from a user. User input 148 includes an indication of whether notification 142 was correct or incorrect.

If notification 142 was incorrect, model generation process 124 identifies mode 112 as the mode that was used in determining whether to send notification 142 of the abnormality. Model generation process 124 decreases weighting 131 of mode 112 relative to other modes in plurality of modes 110. Model generation process 124 updates model 126 to account for the change in weighting 131 of mode 112 to form updated model 150. For example, model generation process 124 generates updated model 150 to include higher probabilities associated with the modes other than mode 112 and a lower probability for mode 112 relative to the probabilities from model 126. In these examples, model generation process 124 generates an updated model whenever notification 142 is incorrect.

Model generation process 124 stores updated model 150 in storage device 129. Model generation process 124 replaces model 126 with updated model 150. Data comparison process 130 uses updated model 150 in future comparisons with activity data 134. As multiple user inputs are received, model generation process 124 continues to update updated model 150. Continued updating of updated model 150 results in a model of activity 102 that is more accurate and more relevant to the user than previous models.

The illustration of data management environment 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example in some illustrative embodiments, storage device 129 may not include training data 116. Once model 126 has been generated, training data 116 may be deleted from storage device 129. In other examples, only portions of training data 116 may be saved to assist in determining which modes in plurality of modes 110 should have weighting 131 adjusted.

In other illustrative examples, model 126 may be a model for proper and improper movements of objects 108. For example, activity data 134 may include images of objects 108 moving. The images of objects 108 may be analyzed to determine values for directions and distances of the movement of objects 108. The values may be compared with model 126 to determine whether the movement of objects 108 is consistent with safety and/or security regulations. Thus, for example, notification 142 may be a notification that a person or a vehicle has moved in a manner that is inconsistent with safety and/or security regulations.

Figure 2:
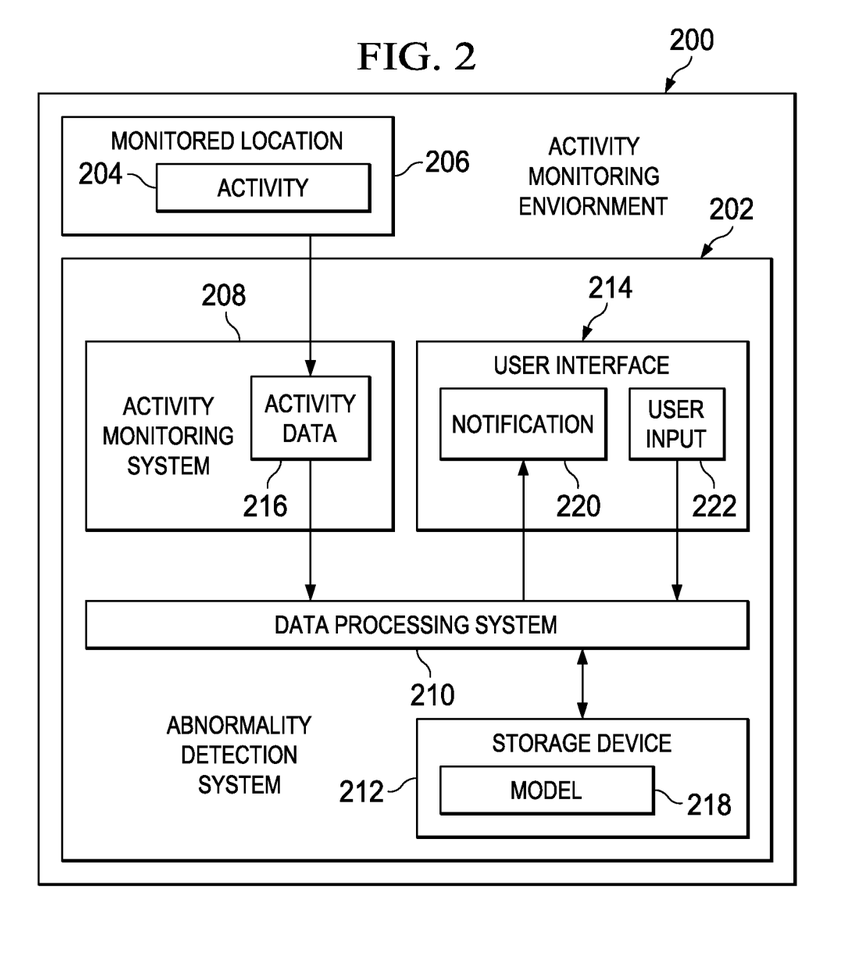
FIG. 2 is a block diagram of an activity monitoring environment in accordance with an illustrative embodiment.

With reference now to FIG. 2, a block diagram of an activity monitoring environment is depicted in accordance with an illustrative embodiment. Activity monitoring environment 200 is an environment that may exist in data management environment 100 in FIG. 1. Activity monitoring environment 200 includes abnormality detection system 202. Abnormality detection system 202 is an example of a system that detects abnormalities in a performance of an activity. Abnormality detection system 202 includes components that are examples of embodiments of components described in data management environment 100 in FIG. 1.

In these illustrative examples, abnormality detection system 202 includes activity monitoring system 208, data processing system 210, storage device 212, and user interface 214.

Activity monitoring system 208 generates activity data 216 from activity 204 at monitored location 206. For example, activity monitoring system 208 may include any number of different sensing devices and/or data capturing devices for obtaining measurements from activity 204. Activity monitoring system 208 may also obtain information about conditions in monitored location 206 while activity 204 is performed. For example, activity monitoring system 208 may obtain values for temperature, weather conditions, colors of traffic lights for roads, time of day, day of week, season, and/or any other conditions in monitored location while activity 204 is performed. Activity monitoring system 208 may obtain the information about the conditions from sensing devices within activity monitoring system 208. Activity monitoring system 208 may also obtain the information about the conditions from external data sources, such as, for example a data network and/or the internet. All of this information may be included in activity data 216.

In these examples, activity data 216 may need to include at least the same types of information that were used in generating model 218. Data processing system 210 compares activity data 216 with model 218. In order to fully compare activity data 216 with model 218, activity data 216 may use same types of information that were used in generating model 218.

If activity data 216 is identified as abnormal, notification 220 is sent from data processing system 210 to user interface 214. In these examples, notification 220 may be a message that is sent to a user device, such as a telephone or computer. In other examples, notification 220 may be an audible or visual alert. In response to notification 220, a user sends user input 222 to data processing system 210 using user interface 214. User input 222 may be sent using any number of different forms of communication. For example, user input 222 may be entered into an application displayed in a web browser. In other examples, user input 222 may be a text message sent using a mobile phone. In yet other examples, user input 222 may be entered directly into data processing system 210 using user interface 214.

Figure 3:
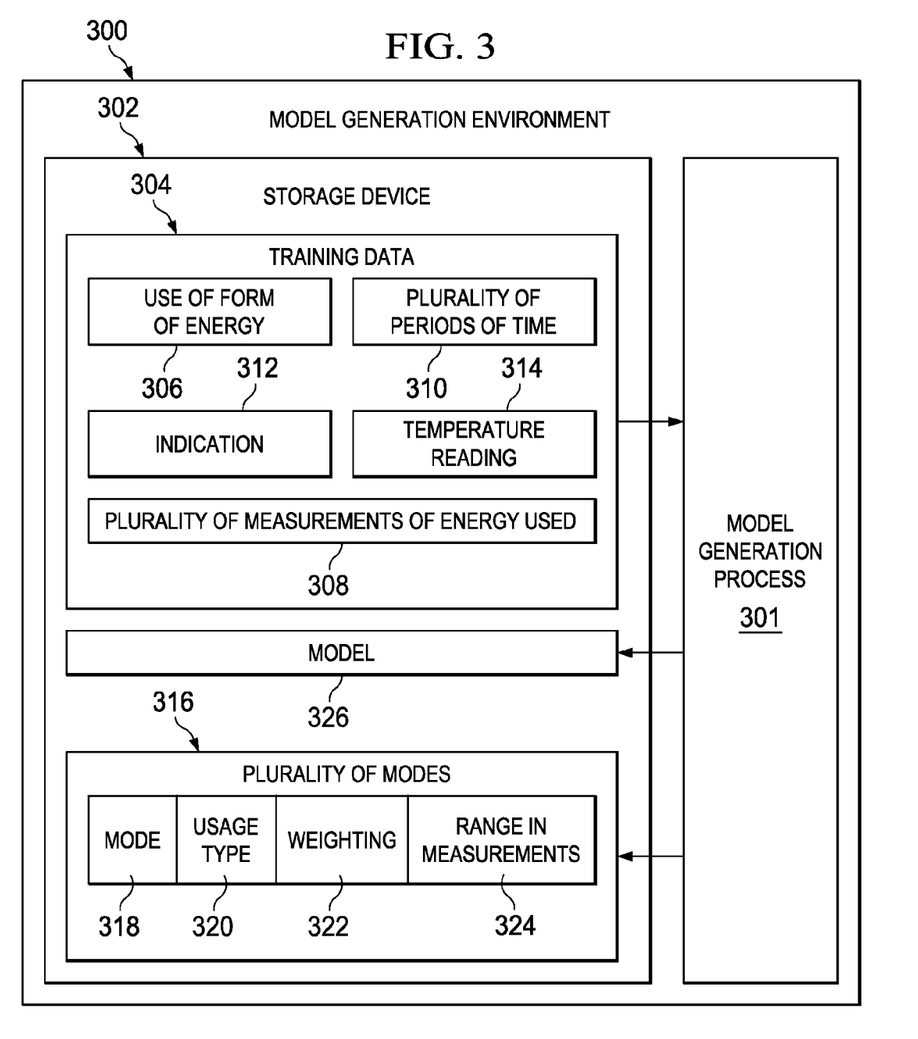
FIG. 3 is a block diagram of a model generation environment in accordance with an illustrative embodiment.

With reference now to FIG. 3, a block diagram of a model generation environment is depicted in accordance with an illustrative embodiment. Model generation environment 300 is an environment in which illustrative embodiments may be implemented. Model generation environment 300 includes model generation process 301. Model generation process 301 is an example of one embodiment of model generation process 124 in FIG. 1.

In this illustrative example, storage device 302 stores training data 304 from use of form of energy 306. Training data 304 includes plurality of measurements of energy used 308. Plurality of measurements of energy used 308 is a measurement of use of form of energy 306 during each of plurality of periods of time 310. For example, each period of time in plurality of periods of time 310 may be a different day.

Each of plurality of measurements of energy used 308 includes indication 312 whether use of form of energy 306 during the period of time is normal or abnormal. Indication 312 is supplied with training data 304. Training data 304 also includes temperature reading 314. Temperature reading 314 is a value for temperature during use of form of energy 306. Temperature reading 314 is included for each period of time in plurality of periods of time 310. For example, temperature reading 314 may be a high, low, average, and or other value for temperature during a day.

Model generation process 301 identifies plurality of modes 316 from training data. In one example, each period of time in plurality of periods of time 310 may be a different mode in plurality of modes 316. In other examples, model generation process 301 may group periods of time in plurality of periods of time 310 together that have the same indication 312 and similar values for plurality of measurements of energy used 308 and temperature reading 314.

For each mode 318 that is identified, model generation process 301 identifies usage type 320, weighting 322, and range in measurements 324. Usage type 320 is an identifier of whether mode 318 is either normal or abnormal. Range in measurements 324 is a range in values for both plurality of measurements of energy used 308 and temperature reading 314 for each periods of time included in mode 318. Weighting 322 is a probability that new measurements for use of form of energy 306 having values similar to values in range in measurements 324 are an example of mode 318. Weighting 322 is based on the number of times periods of time included in mode 318 occurred relative to a total number of different periods of time in plurality of periods of time 310.

Model generation process 301 generates model 326 using information identified about plurality of modes 316. For example, model 326 may be generated using kernel density estimation. Kernel density estimation is a non-parametric way of estimating the probability density function of a random variable. Each of the modes in plurality of modes 316 would be estimated using a kernel. A kernel is a symmetric function that integrates to one. Kernel density may be estimated using the following function, where K is the kernel, n is the number of data points, and h is a predetermined parameter called the bandwidth of the kernel.

$$\hat{f}_h(x) = \frac{1}{n}\sum_{i=1}^{n} K_h(x - x_i) = \frac{1}{nh}\sum_{i=1}^{n} K\left(\frac{x - x_i}{h}\right)$$

When each of the kernels has been estimated, the kernels are added to produce a density function showing the density estimation of the kernels as a function of the data points. An example of a density function is provided and discussed below in FIG. 5. This density function is an example of model 326 that is generated using plurality of modes 316.

In these examples, plurality of modes 316 includes values for both plurality of measurements of energy used 308 and temperature reading 314. Thus, for example, the density function of model 326 is three dimensional. Model 326 is a function of temperature reading, measurement of energy used, and density estimation.

The illustration of activity monitoring environment 200 in FIG. 2 and model generation environment 300 in FIG. 3 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, abnormality detection system 202 may be a single device located near monitored location 206. In other illustrative embodiments, abnormality detection system 202 includes a plurality of separate devices. For example, activity monitoring system 208 may be located in or near monitored location 206. Activity monitoring system 208 may send activity data 216 to data processing system 210 over wired and/or wireless communication links. Data processing system 210 may include user interface 214 and storage device 212. In other examples, user interface 214 may be a separate device that a user may have at a remote location.

In yet other illustrative embodiments, training data 304 may include n numbers of different types of values for use of form of energy 306. Thus, for example, model 326 may be an n dimensional function.

Figure 4:
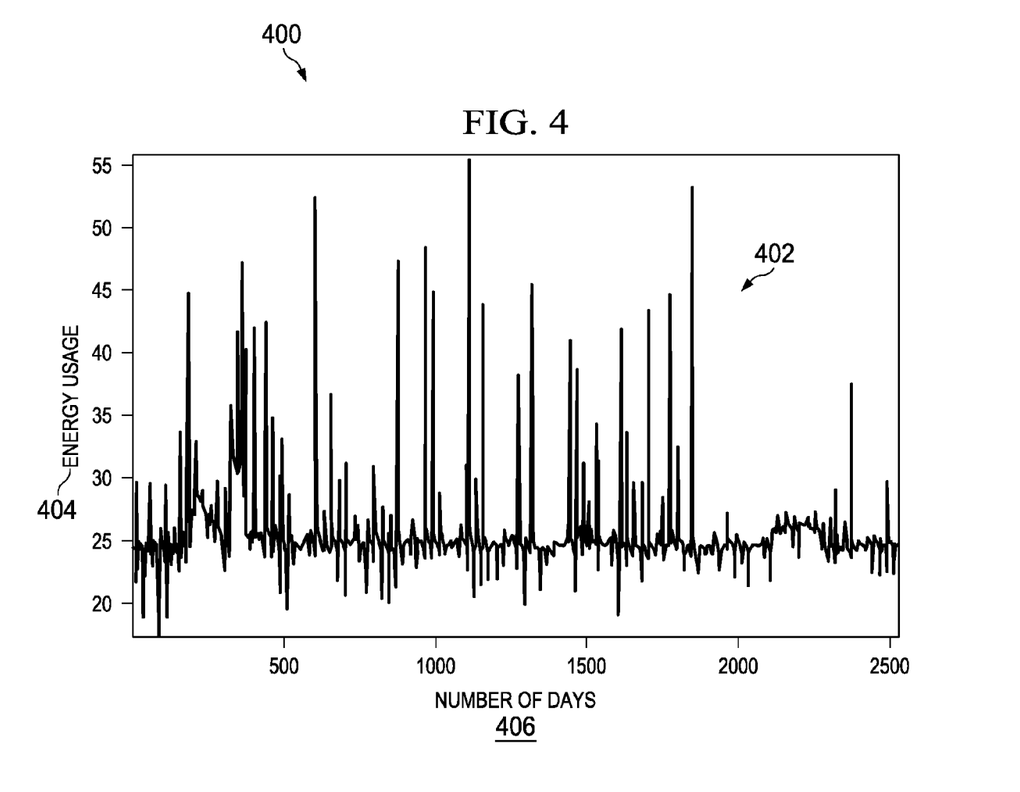
FIG. 4 is an illustration of a graph of measurements of energy usage over periods of time in accordance with an illustrative embodiment.

With reference now to FIG. 4, an illustration of a graph of measurements of energy usage over periods of time is depicted in accordance with an illustrative embodiment. Graph 400 is an example of training data 304 in FIG. 3. Graph 400 may also be an example of activity data 216 in FIG. 2. Graph 400 includes data 402. Data 402 is a measurement for energy usage 404 over number of days 406.

Figure 5:
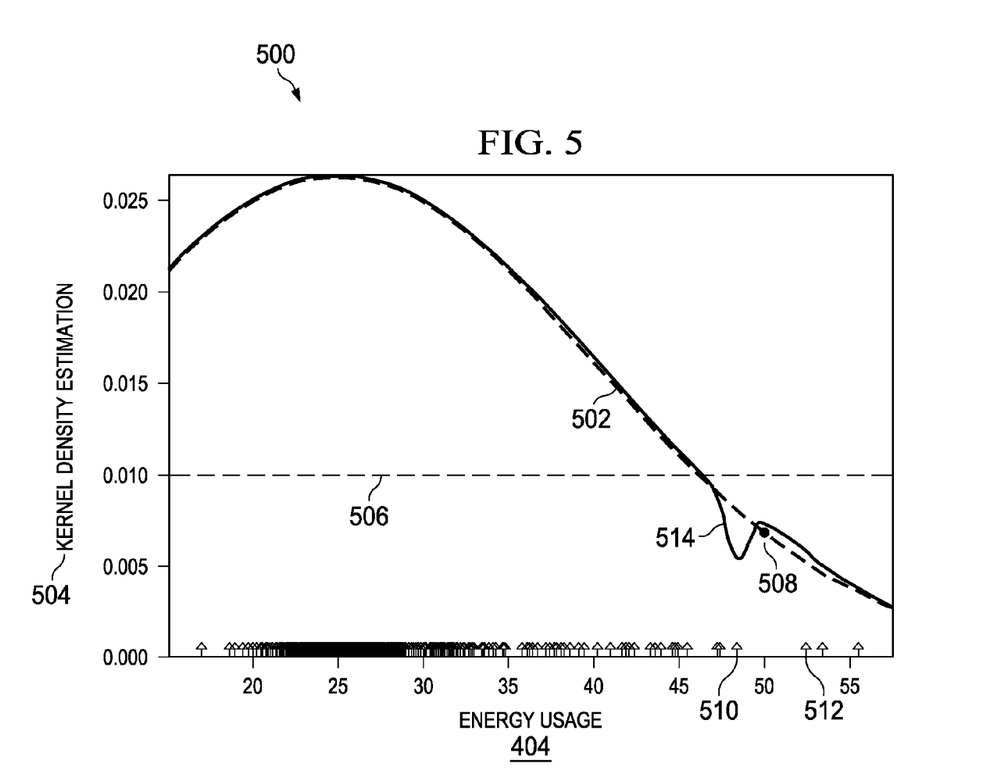
FIG. 5 is an illustration of a graph of a model used in identifying abnormalities in data in accordance with an illustrative embodiment.

With reference now to FIG. 5, an illustration of a graph of a model used in identifying abnormalities in data is depicted in accordance with an illustrative embodiment. Graph 500 is a graph of model 502 of energy usage 404 illustrated in graph 400 in FIG. 4. Model 502 is an example of one embodiment of model 126 in FIG. 1.

In these examples, model 502 is a function of kernel density estimation 504 as a function of energy usage 404. Kernel density estimation 504 is a probability that new value for energy usage 404 will occur. In this example, a number of data points for energy usage 404 are located around 25 units. Thus, when new values for energy usage 404 are around 25 units, the probability that the new values are normal uses of energy is higher than when the new values for energy usage 404 are less than or higher than 25 units.

In one illustrative embodiment, threshold value 506 may be selected for kernel density estimation 504. If kernel density estimation 504 for a new value is greater than or equal to threshold value 506, the new value may be considered to be normal. On the other hand if kernel density estimation 504 for a new value is less than threshold value 506, the new value may be considered to be abnormal.

In another illustrative embodiment, a new value may be compared with data points in energy usage 404. For example, new point 508 may be compared with model 502. New point 508 is close to data point 510 and data point 512. For example, data point 510 may illustrate a mode that is identified as abnormal, while data point 512 illustrates a mode that is identified as normal. In this example, data point 510 may be selected as matching new point 508 because new point 508 is closer to data point 510 and data point 510 has a higher value for kernel density estimation 504.

If a notification of an abnormality is generated that is incorrect, model 502 may be updated. For example, a weighting of data point 510 may be decreased relative to other data points for energy usage 404. The change in weighting may be reflected by updated model 514. In updated model 514 data point 510 has a lower value for kernel density estimation 504 than does data point 512. Thus, the next time a new data point has the same value for energy usage 404 as new point 508 did data point 512 may be selected as matching new data point because of data points higher value for kernel density estimation 504.

The illustration of graph 400 in FIG. 4 and graph 500 in FIG. 5 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 6:
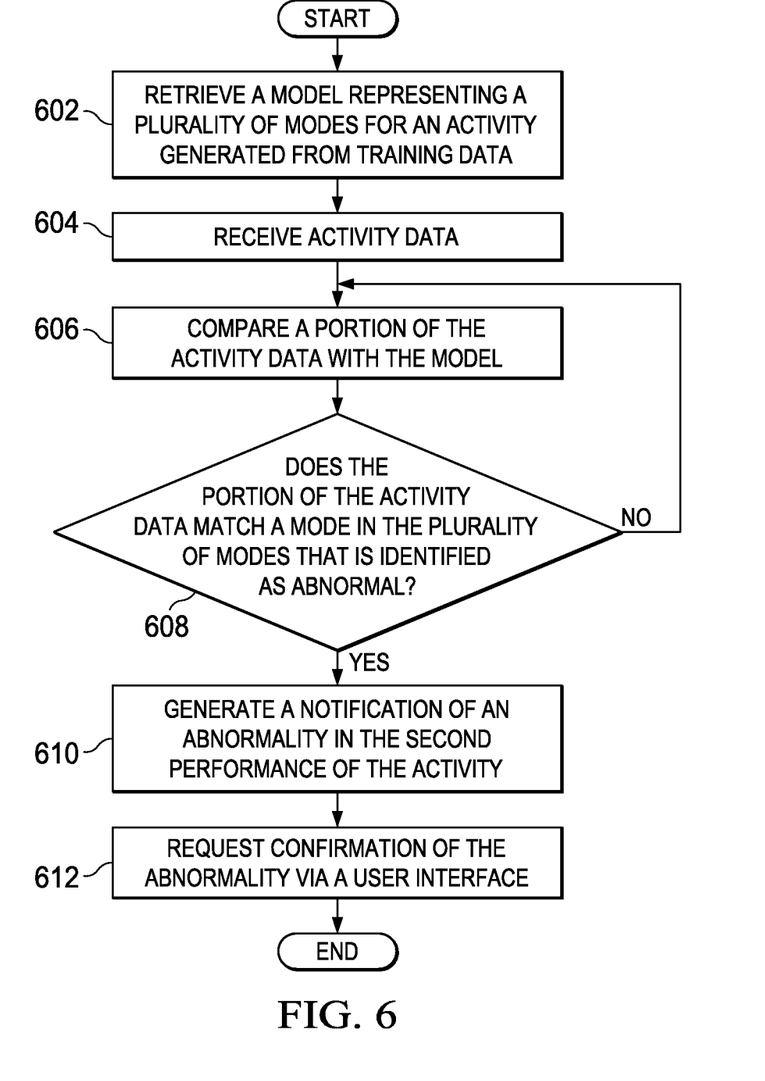
FIG. 6 is a flowchart for a process for identifying abnormalities in data in accordance with an illustrative embodiment.

With reference now to FIG. 6, a flowchart for a process for identifying abnormalities is depicted in data in accordance with an illustrative embodiment. The process illustrated in FIG. 6 may be implemented by data comparison process 130 in FIG. 1. The process also may be implemented in abnormality detection system 202 in FIG. 2.

The process begins by retrieving a model representing a plurality of modes for an activity generated from training data (step 602). In step 602, the model may be generated by model generation process 124 in FIG. 1. The training data includes a first plurality of measurements of a first performance of the activity over a period of time. For example, the first performance may be a plurality of performances that have already occurred. Each of the plurality of modes is identified as one of normal and abnormal. The process then receives activity data (step 604). In step 604, the activity data includes a second plurality of measurements of a second performance of the activity. For example, the second performance of the activity may be a performance that is being monitored.

Thereafter, the process compares a portion of the activity data with the model (step 606). In step 606, the portion may be data from a period of time that matches the period of time for values used in the model. The process then determines whether the portion of the activity data matches a mode in the plurality of modes that is identified as abnormal (step 608). In step 608, the portion of the activity data may match the mode by having values for measurements that are similar to those of the mode. The mode may also be identified by having a weighting that is higher than other weightings. If the process determines that the portion of the activity data matches a mode in the plurality of modes that is identified as normal, the process returns to step 606 and compares another portion of the activity data with the model.

If, however, the process determines that the portion of the activity data matches a mode in the plurality of modes that is identified as abnormal, the process generates a notification of an abnormality in the second performance of the activity (step 610). Thereafter, the process requests confirmation of the abnormality via a user interface, with the process terminating thereafter (step 612). In step 612, With reference now to FIG. 7, an illustration of a flowchart of a process for updating a model based on user feedback is depicted in accordance with an illustrative embodiment. The process illustrated in FIG. 7 may be implemented by model generation process 124 in data processing system 138 in FIG. 1.

Figure 7:
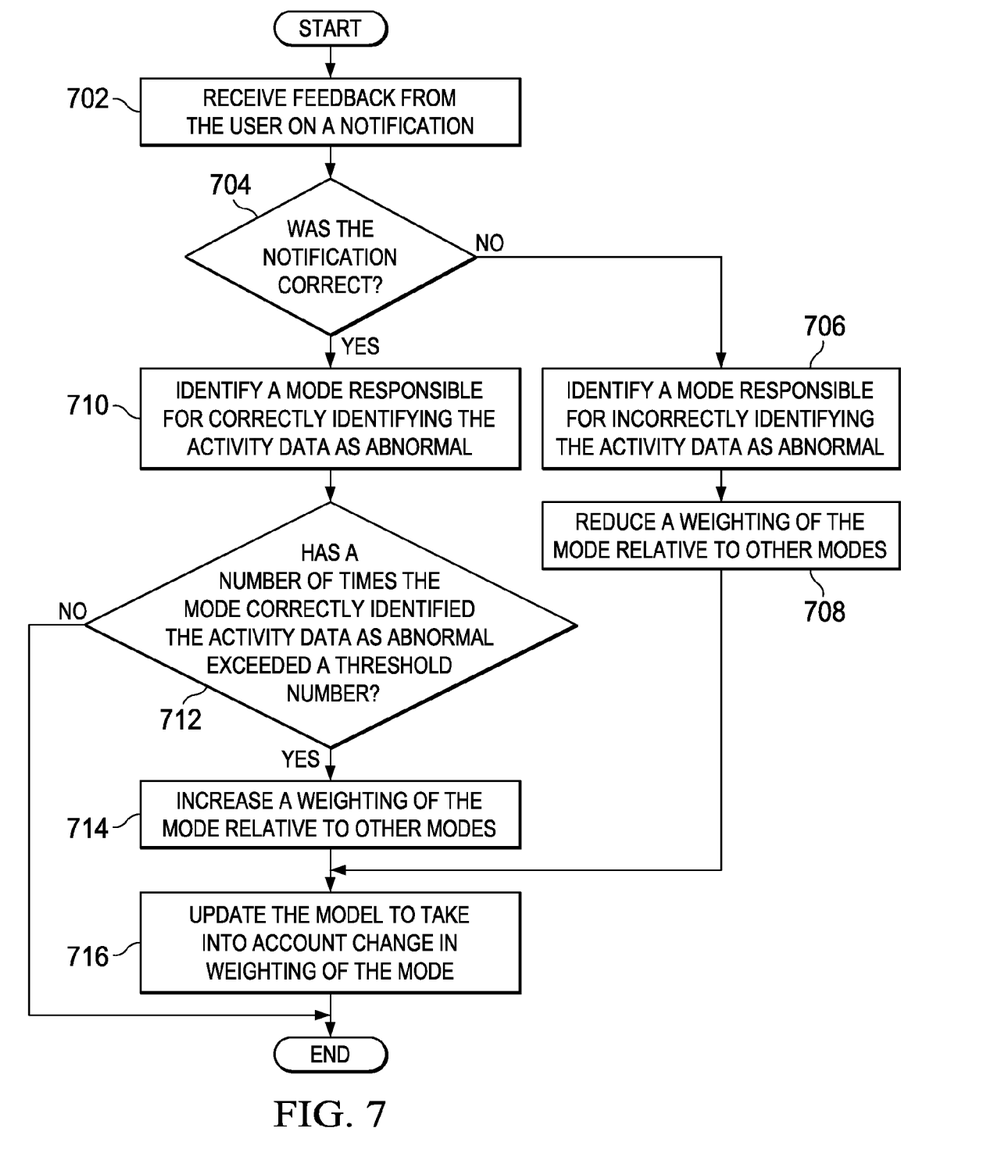
FIG. 7 is a flowchart for a process for updating a model based on user feedback in accordance with an illustrative embodiment.

The process begins by receiving feedback from the user on a notification (step 702). In step 702, the feedback may have been requested because the notification was a notification of detection of an abnormality. The process then determines whether the notification was correct (step 704). In step 704, the process determines whether the notification was correct from the feedback provided by the user.

If the process determines that the notification was incorrect, the process identifies a mode responsible for incorrectly identifying the activity data as abnormal (step 706). In step 706, the mode may be identified from a model, such as, for example, model 126 in FIG. 1. The mode may also be identified from searching training data in a storage device, such as, for example, storage device 129 in FIG. 1

Thereafter, the process reduces a weighting of the mode relative to other modes (step 708). In step 708, each of the modes has a weighting. The weighting controls the probability that the mode will be selected to match activity data having values similar to values of the mode. The process then proceeds to step 716 discussed below.

If, however, process determines that the notification was correct, the process identifies a mode responsible for correctly identifying the activity data as abnormal (step 710). The process then determines whether a number of times the mode correctly identified the activity data as abnormal exceeds a threshold number (step 712). In step 712, the threshold number may be selected by an administrator to prevent the model from changing too frequently. If the process determines that the number of times the mode correctly identified the activity data as abnormal has not exceeded the threshold number, the process does not update the model and terminates thereafter.

If the process determines that the number of times the mode correctly identified the activity data as abnormal has exceeded the threshold number, the process increases a weighting of the mode relative to other modes (step 714). In step 714, the increase in the weighting of the mode increases a probability that the mode will be selected to match activity data having values similar to values of the mode. The process then updates the model to take into account change in weighting of the mode, with the process terminating thereafter (step 716). In step 716, the updated model may be used in place of the model by a data comparison process, such as, for example, data comparison process 130 in FIG. 1.

Figure 8:
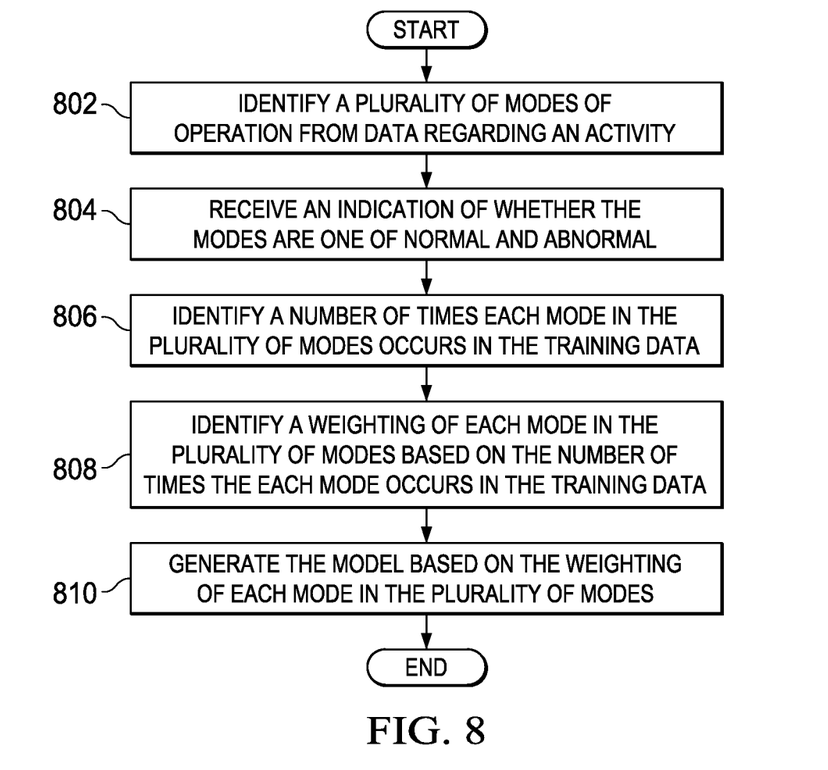
FIG. 8 is a flowchart for a process for generating a model used in identifying abnormalities in data in accordance with an illustrative embodiment.

With reference now to FIG. 8, an illustration of a flowchart of a process for generating a model used in identifying abnormalities in data is depicted in accordance with an illustrative embodiment. The process illustrated in FIG. 8 may be implemented by model generation process 124 in data processing system 138 in FIG. 1. The process also may be implemented in model generation process 301 in FIG. 3.

The process begins by identifying a plurality of modes of operation from data regarding an activity (step 802). In step 802, the modes may be data from an individual performance of the activity. The modes may also be groups of performances of the activity having similar values for measurements. The process then receives an indication of whether the modes are one of normal and abnormal (step 804). Thereafter, the process identifies a number of times each mode in the plurality of modes occurs in the training data (step 806). In step 806, the number of times the mode occurs may be the result of similar values for measurements for one or more performances of the activity.

The process then identifies a weighting of each mode in the plurality of modes based on the number of times the each mode occurs in the training data (step 808). Thereafter, the process generates the model based on the weighting of each mode in the plurality of modes, with the process terminating thereafter (step 810). In step 810, the model may be generated using kernel density estimation. For example, the higher the weighting for the mode the higher the density of the kernels for the mode relative to other modes.

The flowchart and block diagrams in the Figures illustrate the architecture, functionality, and operation of possible implementations of systems, methods and computer program products according to various illustrative embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Figure 9:
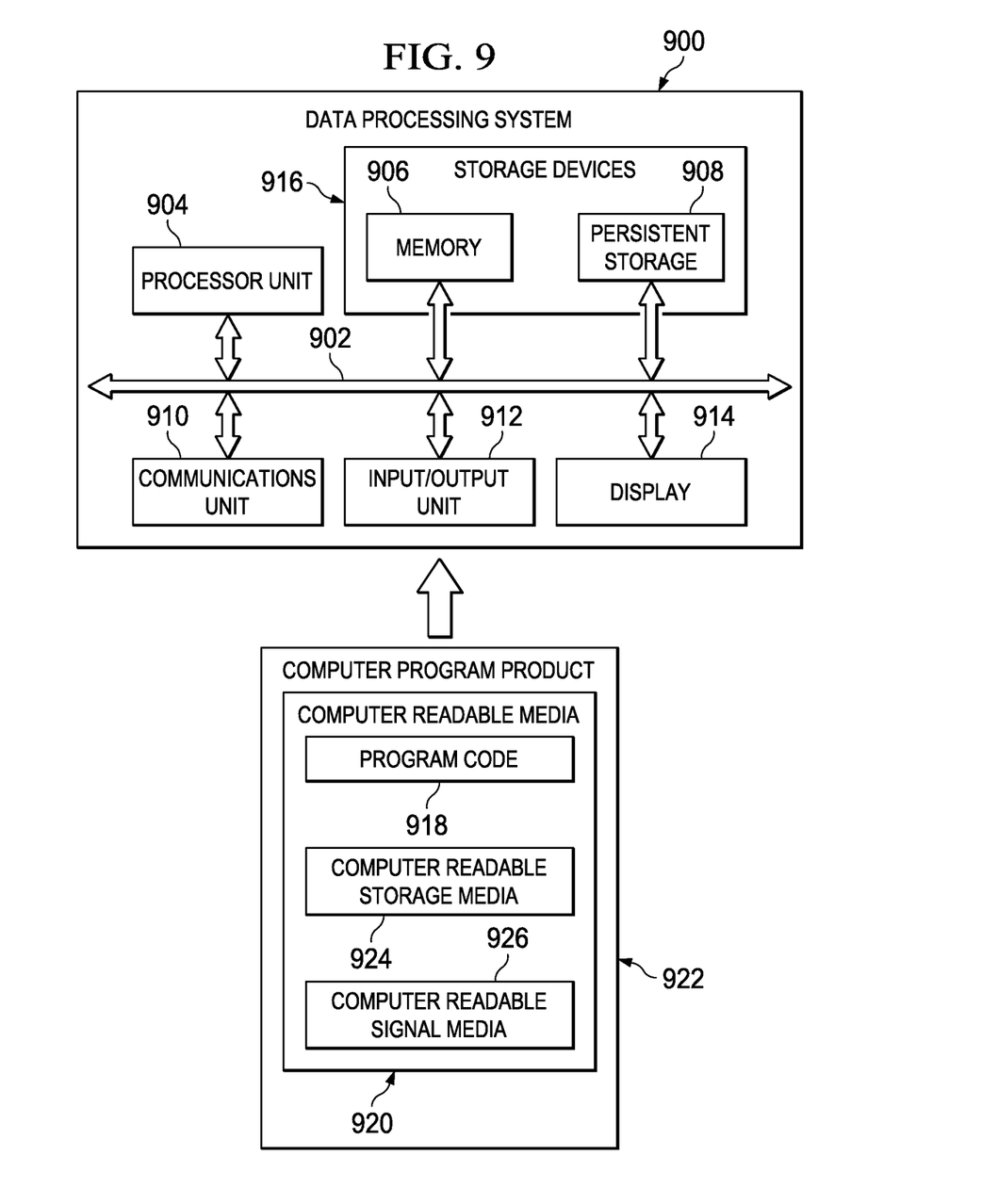
FIG. 9 is an illustration of a data processing system in accordance with an illustrative embodiment.

Turning now to FIG. 9, an illustration of a block diagram of a data processing system is depicted in accordance with an illustrative embodiment. In this illustrative example, data processing system 900 includes communications fabric 902, which provides communications between processor unit 904, memory 906, persistent storage 908, communications unit 910, input/output (I/O) unit 912, and display 914. In these illustrative examples, data processing system 900 is an example of one implementation of data processing system 138 in FIG. 1. Data processing system 900 is also one example of data processing system 210 in FIG. 2.

Processor unit 904 serves to process instructions for software that may be loaded into memory 906. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for processing by processor unit 904. The processes of the different embodiments may be performed by processor unit 904 using computer implemented instructions, which may be located in a memory, such as memory 906.

These instructions are referred to as program code, computer usable program code, or computer readable program code that may be read and processed by a processor in processor unit 904. The program code in the different embodiments may be embodied on different physical or tangible computer readable media, such as memory 906 or persistent storage 908.

Program code 918 is located in a functional form on computer readable media 920 that is selectively removable and may be loaded onto or transferred to data processing system 900 for processing by processor unit 904. Program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900. In these illustrative examples, computer readable storage media 924 is a non-transitory computer readable storage medium.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

Storage devices 916 are examples of implementations of storage device 129 in FIG. 1, storage device 212 in FIG. 2, and storage device 302 in FIG. 3. Further, program code 918 may include program code for generating a model, such as, for example, model generation process 301 in FIG. 3. Further, program code 918 may include program code for identifying abnormalities in data a model, such as, for example, data comparison process 130 in FIG. 1.

The different components illustrated for data processing system 900 are not meant to provide architectural limitations to the manner in which different embodiments may be implemented. The different illustrative embodiments may be implemented in a data processing system including components in addition to, or in place of, those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

As another example, a storage device in data processing system 900 is any hardware apparatus that may store data. Memory 906, persistent storage 908, and computer readable media 920 are examples of storage devices in a tangible form.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 906, or a cache, such as found in an interface and memory controller hub that may be present in communications fabric 902.

As another example, a storage device in data processing system 900 is any hardware apparatus that may store data. Memory 906, persistent storage 908, and computer readable media 920 are examples of storage devices in a tangible form.

The different illustrative embodiments recognize and take into account that it may be desirable to identify abnormalities in performances in activities. However, activities may have multiple different modes of operations that are normal and abnormal. For example, normal modes may have values for measurements that are similar to or located around values for abnormal modes. Comparison of measurements for performance of the activity with expected values may not produce accurate identification of all abnormal activities. Failing to identify abnormal activities can lead to misuse of resources or movements that are not compliant with rules.

The different illustrative embodiments also recognize and take into account that that incorporating user feedback can improve models for identifying abnormalities in activities. Exceptions often occur within rules and expectations. A model for the activity may not include all exceptions. Additionally, errors can exist in the model. For example, the model may have been generated using data that was incomplete or inaccurate. In other examples, a model may over represent certain modes while under representation other modes.

Thus, the illustrative embodiments provide a computer implemented method, data processing system, and computer program product for identifying abnormalities in data. A model representing a plurality of modes for an activity generated from training data is retrieved. The training data includes a first plurality of measurements of a first performance of the activity over a period of time. Each of the plurality of modes is identified as one of normal and abnormal. Activity data including a second plurality of measurements of a second performance of the activity is received. A portion of the activity data is compared with the plurality of modes in the model. A notification of an abnormality in the second performance of the activity is generated in response to an identification that the portion of the activity data matches a mode in the plurality of modes identified as abnormal. Confirmation of the abnormality is requested via a user interface.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for identifying abnormalities in data, the method comprising:

retrieving a model representing a plurality of modes for an activity generated from training data comprising a first plurality of measurements of a first performance of the activity over a period of time, wherein each of the plurality of modes is identified as one of normal and abnormal;

receiving activity data comprising a second plurality of measurements of a second performance of the activity;

comparing a portion of the activity data with the plurality of modes in the model;

responsive to identifying that the portion of the activity data matches a mode in the plurality of modes that is identified as abnormal, generating a notification of an abnormality in the second performance of the activity and requesting confirmation of the abnormality via a user interface;

identifying the plurality of modes for the activity from the training data, wherein a first mode in the plurality of modes comprises a range in measurements expected during performance of the activity;

receiving an indication of whether the first mode in the plurality of modes is one of normal and abnormal; and storing the first mode and the indication in association with the model in a storage device.

2. The method of claim 1 further comprising:

responsive to receiving a user input that the notification of the abnormality is incorrect, identifying the mode in the plurality of modes that matched the portion of the activity data incorrectly identified as abnormal; and reducing a weighting of the mode relative to other modes in the plurality of modes, wherein the weighting of the mode controls a probability that the mode will be identified as matching the portion of the activity data.

3. The method of claim 2 further comprising:

updating the model to take into account reduction of the weighting of the mode to form an updated model; and repeating the comparing of the portion of the activity data with the plurality of modes using the updated model.

4. The method of claim 1 further comprising:

identifying a number of times each mode in the plurality of modes occurs in the training data;

identifying a weighting of a mode in the plurality of modes based on the number of times the mode occurs in the training data wherein the weighting of the mode controls a probability that the mode will be identified as matching the portion of the activity data; and generating the model based on the weighting of each mode in the plurality of modes.

5. The method of claim 1, wherein first plurality of measurements includes measurements of energy used and wherein the portion of the activity, data includes energy usage and temperature at a monitored location and further comprising:

identifying a temperature reading at different times during the period of time;

identifying a first mode as a first amount of energy used as a function of temperature, wherein the first mode is a normal usage of energy;

identifying a second mode as a second amount of energy used as a function of temperature, wherein the second mode is an abnormal usage of energy; and determining whether the energy usage at the monitored location matches one of the first mode and the second mode.

6. The method of claim 1, wherein the activity is use of a resource, wherein the abnormality is a use of the resource that is irregular, and wherein the model is generated using kernel density estimation.

7. An apparatus comprising:

a storage device storing a model representing a plurality of modes for use of a form of energy from training data comprising a first plurality of measurements of a first performance of the use of the form of energy over a period of time, wherein each of the plurality of modes is identified as one of normal and abnormal;

a data processing system comprising a processor unit and configured to receive activity data comprising a second plurality of measurements of a second performance of the use of the form of energy and compare a portion of the activity data with the plurality of modes in the model; and a user interface configured to provide a notification of an abnormality in the second performance of the use of the form of energy and provide a request for confirmation of the abnormality, in response to an identification that the portion of the activity data matches a mode in the plurality of modes that is identified as abnormal, wherein the data processing system is further configured to: identify the plurality of modes for the activity from the training data, wherein a first mode in the plurality of modes comprises a range in measurements expected during performance of the activity; receive an indication of whether the first mode in the plurality of modes is one of normal and abnormal; and store the first mode and the indication in association with the model in a storage device.

8. The apparatus of claim 7, wherein the data processing system is further configured to identify the mode in the plurality of modes that matched the portion of the activity data incorrectly identified as abnormal in response to receiving an input from the user interface that the notification of the abnormality is incorrect, and reduce a weighting of the mode relative to other modes in the plurality of modes, wherein the weighting of the mode controls a probability that the mode will be identified as matching the portion of the activity data.

9. The apparatus of claim 8, wherein the data processing system is further configured to update the model to take into account reduction of the weighting of the mode to form an updated model, and repeat the comparing of the portion of the activity data with the plurality of modes using the updated model.

10. The apparatus of claim 9, wherein the storage device is configured to store the updated model in place of the model.

11. A data processing system for identifying abnormalities in data, the data processing system comprising:

a bus system;

a storage device connected to the bus system, wherein the storage device includes program code; and a processor unit connected to the bus system, wherein the processor unit is configured to execute the program code to retrieve a model representing a plurality of modes for an activity generated from training data comprising a first plurality of measurements of a first performance of the activity over a period of time, wherein each of the plurality of modes is identified as one of normal and abnormal, receive activity data comprising a second plurality of measurements of a second performance of the activity, compare a portion of the activity data with the plurality of modes in the model, and generate a notification of an abnormality in the second performance of the activity and request confirmation of the abnormality via a user interface in response to identifying that the portion of the activity data matches a mode in the plurality of modes that is identified as abnormal;

wherein the processor unit is further configured to execute the program code to identify the plurality of modes for the activity from the training data, wherein a first mode in the plurality of modes comprises a range in measurements expected during performance of the activity, receive an indication of whether the first mode in the plurality of modes is one of normal and abnormal, and store the first mode and the indication in association with the model in a storage device.

12. The data processing system of claim 11, wherein the processor unit is further configured to execute the program code to identify the mode in the plurality of modes that matched the portion of the activity data incorrectly identified as abnormal in response to receiving a user input that the notification of the abnormality is incorrect, and reduce a weighting of the mode relative to other modes in the plurality of modes, wherein the weighting of the mode controls a probability that the mode will be identified as matching the portion of the activity data.

13. The data processing system of claim 12, wherein the processor unit is further configured to execute the program code to update the model to take into account reduction of the weighting of the mode to form an updated model, and repeat the comparing of the portion of the activity data with the plurality of modes using the updated model.

14. The data processing system of claim 11, wherein the processor unit is further configured to execute the program code to identify a number of times each mode in the plurality of modes occurs in the training data, identify a weighting of a mode in the plurality of modes based on the number of times the mode occurs in the training data, wherein the weighting of the mode controls a probability that the mode will be identified as matching the portion of the activity data, and generate the model based on the weighting of each mode in the plurality of modes.

15. The data processing system of claim 11, wherein first plurality of measurements includes measurements of energy used wherein the portion of the activity data includes energy usage and temperature at a monitored location, and wherein the processor unit is further configured to execute the program code to identify a temperature reading at different times during the period of time, identify a first mode as a first amount of energy used as a function of temperature, wherein the first mode is a normal usage of energy, identify a second mode as a second amount of energy used as a function of temperature, wherein the second mode is an abnormal usage of energy, and determine whether the energy usage at the monitored location matches one of the first mode and the second mode.

* * * * *